United States Patent [19]

Hedstrom

[11] Patent Number: 5,235,870
[45] Date of Patent: Aug. 17, 1993

[54] MODULAR BRAKE SYSTEM UTILIZING A REACTIVE SLIDE ASSEMBLY

[75] Inventor: Kristen K. Hedstrom, Romeo, Mich.

[73] Assignee: Handy & Harman Automotive Group, Inc., Auburn Hills, Mich.

[21] Appl. No.: 822,801

[22] Filed: Jan. 21, 1992

[51] Int. Cl.⁵ .......................... F16B 9/00; F16C 1/10; B60T 1/00
[52] U.S. Cl. .............. 74/501.5 R; 74/501.6; 74/502; 29/433; 29/437
[58] Field of Search ........... 74/501.5 R, 501.6, 502.2, 74/502, 502.4; 188/112 R, 20; 29/433, 437, 439

[56] References Cited

U.S. PATENT DOCUMENTS

| | | | |
|---|---|---|---|
| 1,950,976 | 3/1934 | Dodge | 74/39 |
| 2,787,917 | 4/1957 | Schroeder | 74/502 |
| 2,821,091 | 1/1958 | Benner | 74/482 |
| 4,020,713 | 5/1977 | Cantley et al. | 74/479 |
| 4,174,099 | 11/1979 | Yamasaki | 74/501.5 R X |
| 4,412,458 | 11/1983 | Derringer | 74/502.4 X |
| 4,553,626 | 11/1985 | Kazmierczak | 180/307 |
| 4,588,200 | 5/1986 | Kanamori | 74/502 X |
| 4,850,241 | 7/1989 | Buckley et al. | 74/502.2 OR |
| 4,914,971 | 4/1990 | Hinkens et al. | 74/501.5 R X |
| 5,016,490 | 5/1991 | Jaksic | 74/501.5 RO |
| 5,080,434 | 1/1992 | Locher | 74/501.5 R X |
| 5,086,662 | 2/1992 | Tayon et al. | 74/501.5 RO |
| 5,131,288 | 7/1992 | Barlas | 74/501.5 R X |
| 5,144,856 | 9/1992 | Roca | 74/501.5 RO |

*Primary Examiner*—Leslie A. Braun
*Assistant Examiner*—Daniel Wittels
*Attorney, Agent, or Firm*—Pennie & Edmonds

[57] ABSTRACT

A modular brake system having a housing and cables connecting a foot or hand brake lever and wheel brakes. The first cable passes through the housing and a reactive slide member therein which simultaneously imports tension to two or more cables to actuate the braking mechanism of one or more wheels.

25 Claims, 4 Drawing Sheets

MODULAR BRAKE SYSTEM UTILIZING A REACTIVE SLIDE ASSEMBLY

BACKGROUND OF THE INVENTION

1. Field of the Invention

The invention relates to automotive brake systems particularly for parking brakes. These brake systems are typically hand or foot actuated to impart tension on a strand which in turn imparts a force to set a brake or brakes. This invention uses a reactive slide enclosed in a housing to simultaneously impart tension to two or more strands to actuate brake mechanism.

2. Background Art

The use of lever actuated strands to set brakes is known in the art. Strands may act between two fixed points to impart a force to brake drums or calipers when one end is pulled by a setting lever that may be hand or foot activated. Sheathed strands, or cables, may be used in a similar fashion with the advantage that the strand itself is protected. Both implementations rely upon an actuating hand or foot mechanism and commonly employ, a bracket joining two brake strands so that they may be commonly actuated to impart uniform brake force to a drum or caliper. This construction requires that the assembly to achieve this either be housed within the vehicle to protect it from weathering or in the alternative, disposed beneath the vehicle where it is exposed to weathering. It is desirable to have a simplified brake system that is easily assembled to a motor vehicle and has the features of simplicity and weather resistance. The brake systems heretofore have not achieved this result.

SUMMARY OF THE INVENTION

One object of the invention is to provide a modular brake system that is simply constructed and easily assembled onto a vehicle and has the characteristic that it is resistant to the effects of weathering. A modular housing is constructed with an internal slide. A first cable serves both as a link with a foot or hand brake and to set one of the brakes—typically the right rear brake. This dual function cable has the portion of its conduit between the foot or hand actuating mechanism and the housing affixed to an opening in the housing. The strand within slidably passes through the slide and exits through a second conduit affixed to the housing opposite the entry opening and onto the right rear brake. A second cable is affixed to the housing adjacent to the first cable but opposite the direction that the first cable strand exits the housing to connect to the right rear brake. This second cable strand is likewise housed within a conduit and the strand connects the left rear brake and the slide to pull this strand in the same direction that the slide is moved by the conduit of the first cable. When the first cable strand is pulled by the actuating mechanism, the slidable cable within pulls the right rear brake mechanism. At the same time, the curved conduit surrounding this first cable strand, is compressed by its inner strand under a tensile load to exert a compressive force on the slide to force the slide to move in a direction opposite to the direction of the sliding motion of the first cable strand. The resulting motion of the slide pulls the second cable strand in the opposite direction of the first cable strand to set the left rear brake.

Another object of this invention is to reduce vehicle assembly operations by providing a preassembled cable system.

Yet another objective of this invention is to provide a vehicle braking system that provides increased load and travel efficiency for the brake operating mechanism.

Still another object of this invention is to create a braking system in which the actuating mechanism within the housing is constructed to reduce the cable system stack-ups by reducing the total number of components within the system.

Yet another object of this invention is to design a system in which the mechanism is housed so as to increase its life by making it corrosion resistant and water tight.

DESCRIPTION OF THE PREFERRED EMBODIMENTS

Figure 1:
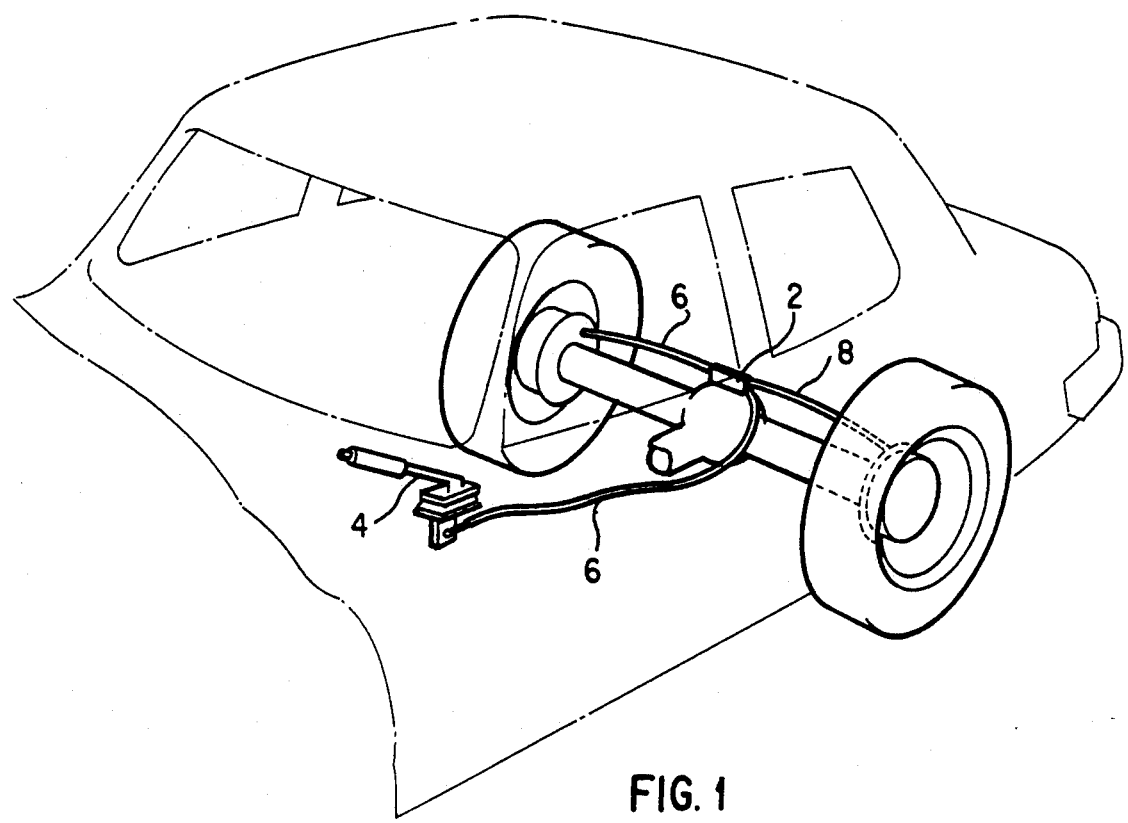
FIG. 1 is a conceptual drawing of the modular brake system of the invention assembled in a motor vehicle.

A modular brake system is shown installed in a motor vehicle in FIG. 1. This representation shows one possible application for the modular brake system of the invention. It may also be used in other vehicles as well as in other applications where there is a nearly simultaneous application of tension forces to two or more actuating strands or cables. As shown in FIG. 1, the modular brake system has a housing 2 mounted on the differential of the vehicle's rear axle. The mounting position is a matter of design choice, however, housing 2 may be mounted in other convenient positions. As shown, a hand brake actuator 4 is mounted in the cab of the vehicle and is connected to the housing 2 by a combined actuator and control cable 6. If desired, a foot actuator may be used instead. This combined actuator and control cable 6 exits the housing 2 and connects to the right rear brake to provide an actuating means for engaging the brake. A second control cable 8 is connected between the housing 2 and the left rear brake to provide an actuating means for that brake. The mechanism for operating both of these brakes with the modular brake system of the invention is more fully described in the following discussion.

Figure 2:
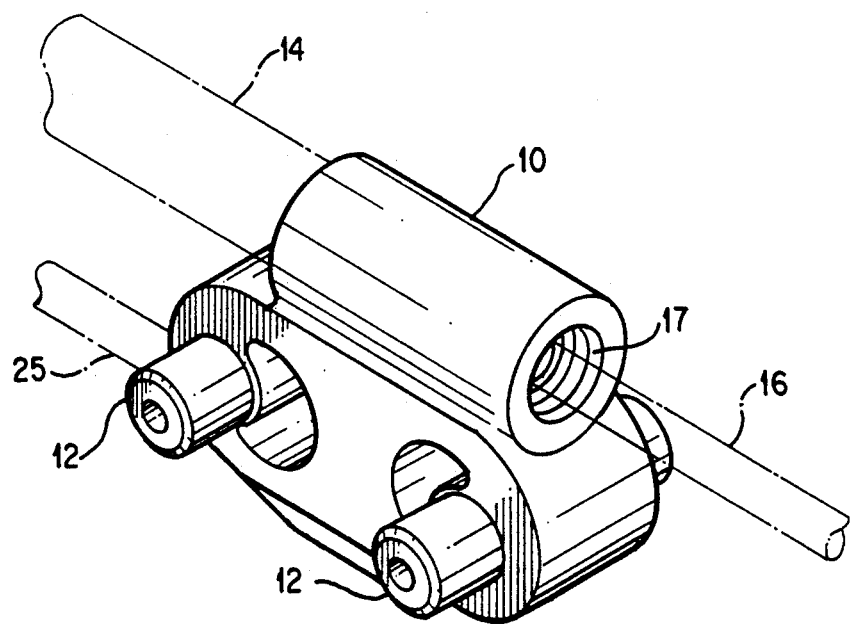
FIG. 2 is a perspective of a reactive slide for use with the control cable of the system.

FIG. 2 shows a perspective of a reactive slide member 10 for use in the system. Either attached or molded onto the reactive slide 10 are four pins 12 that are used to slidably mount the reactive slide 10 in channels in the housing 2 (shown in FIG. 4), to allow it to slide longitudinally within the housing 2. The actuator and control cable 6 has a conduit 14 that is attached to the one side of the reactive slide 10. The actuator and control cable 6 also has a strand or cable 16 slidably disposed within the conduit 14 and attached at one end to the hand brake actuator 4 shown in FIG. 1. As shown in this embodiment, the combined actuator and control strand 16 slides within a barrel 17 cast as part of the reactive slide 10 and then connects to a right rear brake mechanism on an axle. This barrel 17 may also be constructed to have a nipple extending from the orifice that guides the strand 16.

Figure 3:
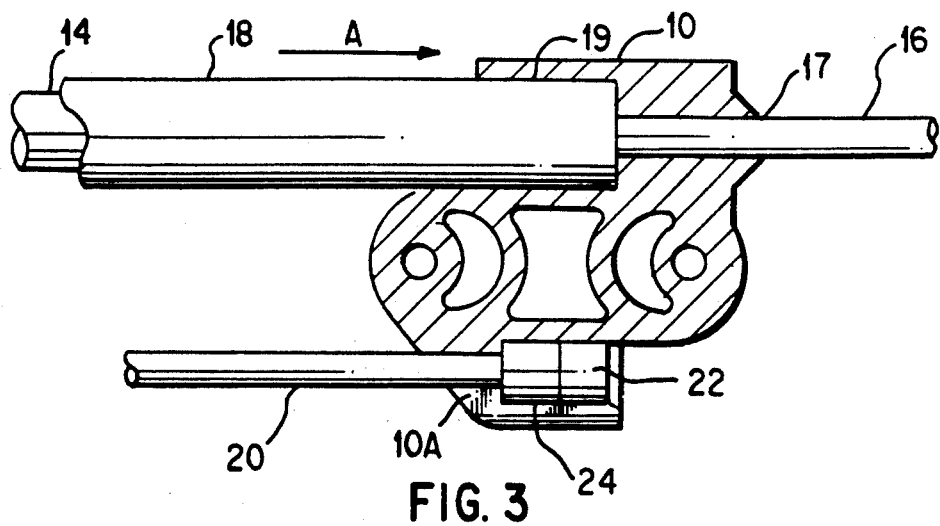
FIG. 3 is a cross section of the reactive slide showing the cable attachments thereto.

FIG. 3 is a cross section of the reactive slide 10 showing the positioning of the actuator and control conduit 14 enclosed within a guide tube 18 crimped onto conduit 14, each of which is attached to cast orifice 19 of reactive slide 10. Various means of attachment, such as a compression fitting of crimped guide tube 18 into orifice 19, may be used to make this connection all of which result in the conduit 14 firmly attached to the reactive slide 10. This view also shows that strand 16 of the actuator and control cable 6 slides within the barrel 17 of the reactive slide 10. A second control cable or strand 20 is attached to the bottom portion 10A of the reactive slide 10 by a button 22 formed on the end of a strand which is engaged in a cast recess 24 in the bottom portion 10A of reactive slide 10. This second control cable 20 is located in the same hemisphere of a generally common plane with the reactive slide 10 as is the connection to the housing 2 of the actuator and control conduit 14. When the reactive slide 10 slides within the housing 2 as a result of the actuator and control conduit providing movement in the direction of arrow A in response to a compressive force, the second control cable 20 is likewise pulled in the same direction and the actuator and control strand 16 is pulled to the opposite direction by the action of the hand brake actuator 4. The compressive load on reactive slide 10 by the actuator and control cable conduit 14 results from the strand 16 being pulled by the hand brake actuator 4 against a wall of the curved actuator and control conduit 14. This mechanical reaction can be seen in more detail by an examination of FIGS. 4 and 5.

Figure 4:
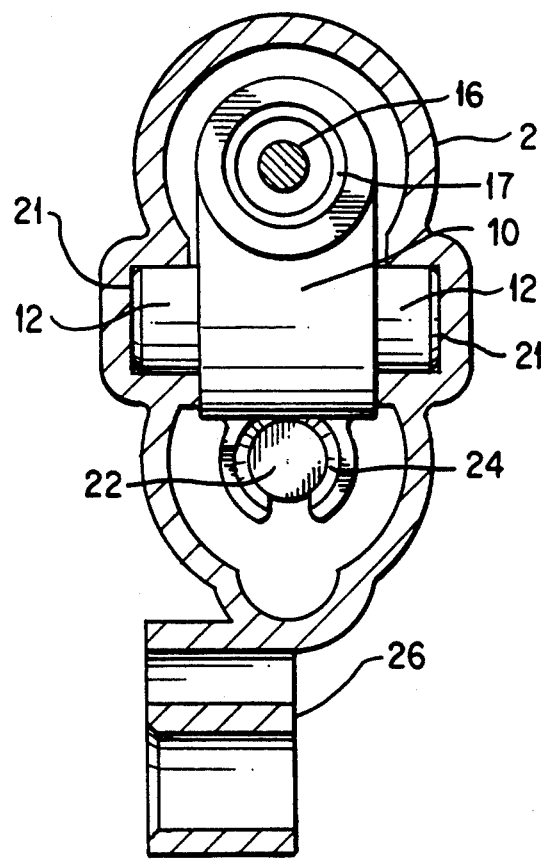
FIG. 4 is a cross section of the modular brake system housing showing the reactive slide mounted in the housing.

FIG. 4 is an end cross section of the modular brake system housing 2 showing in greater detail the position of the reactive slide pins 12 of the reactive slide 10 in the housing channels 21. Also shown is a button 22 which is attached to the second control strand 20 lodged in a cast recess 24 of the reactive slide 10. The housing also has a mounting bracket 26 that provides for easy attachment to the axle or frame of a motor vehicle.

Figure 5:
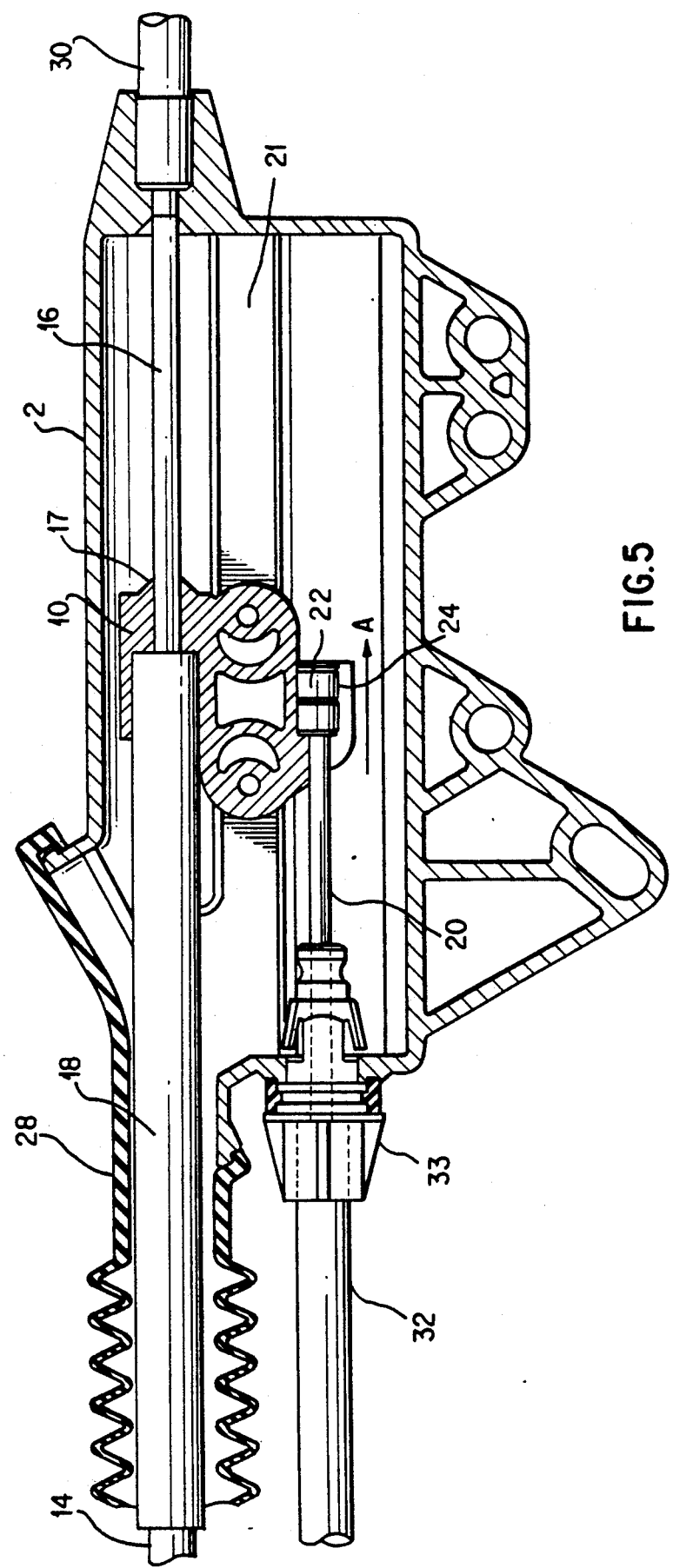
FIG. 5 is a cross section of the modular brake housing with the reactive slide mounted therein and the actuating and control cables assembled to the reactive slide and housing.

FIG. 5 shows the modular brake system housing 2 inside cross section. The reactive slide 10 slides into the housing 2 through the opening in housing 2 shown sealed by flexible boot 28. As described earlier, the reactive slide has pins 12, that slide into the channel 21 in the housing 2 to slidably mount the reactive slide. A guide tube 18, which has the actuator and control cable conduit 14 crimped within, is attached to the reactive slide 10 thereby attaching the conduit 14 to the reactive slide 10, as well. The flexible boot 28, slides over the guide tube 18 to create a seal with the housing 2. Also shown is the actuator and control strand 16 that slides within the conduit 14 and guide tube 18 and barrel 17 of reactive slide 10 and exits the housing 2 through a first control conduit 30 to its connection with a first brake assembly. A second control cable conduit 32 is attached to an opening in the housing 2 by a second conduit fitting 33 generally on the same side of the housing 2 as the guide tube 18. The second control cable strand 20 slides within the second control conduit 32 and is attached to a cast recess 24 in the reactive slide 10 by a button 22 molded onto the end of strand 18. As earlier described, the compressive force of the actuator and control cable conduit 14 disposed within the guide tube 18, forces the reactive slide 10 to move in the right direction of arrow A when a compressive force is applied to the curved conduit 18 by the pulling of strand 16 and simultaneously the control strand 16 pulls the right brake assembly as the reactive slide 10 also moves in the direction of arrow A to pull on the second control strand 20 to pull on a second brake assembly.

Figure 6:
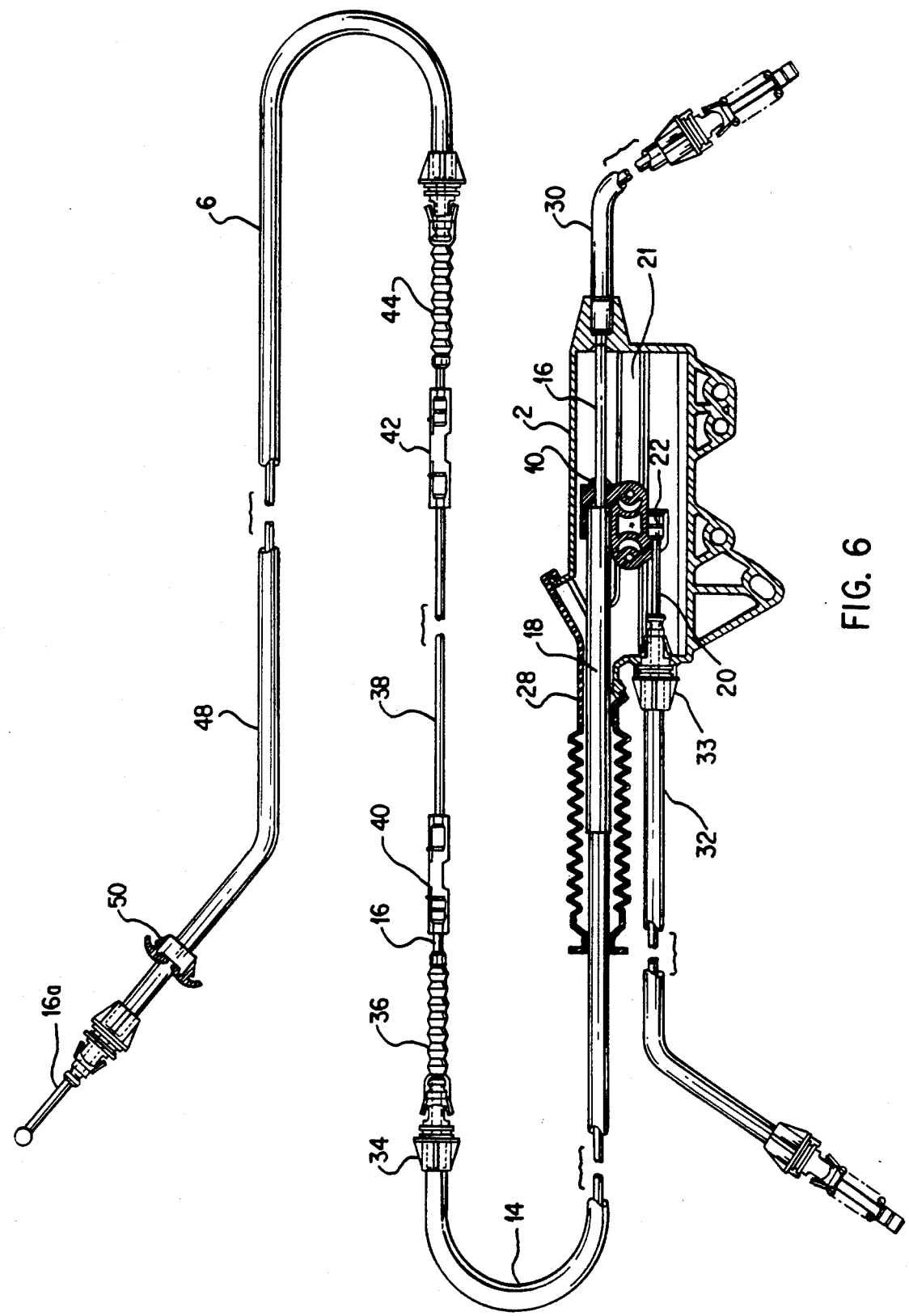
FIG. 6 is a schematic view of the modular brake system.

FIG. 6 shows a schematic drawing of the modular brake system. The actuator and control conduit 14 is shown as mounted in the housing 2 by the flexible boot 28. The curved disposition of the actuator and control cable conduit 14 allows the actuator and control strand 16 to place a compressive force on the conduit 14 when the strand 16 is pulled by a hand brake actuator 4 to place a compressive force on the reactive slide 10 to move it in the direction of arrow A within the housing as shown.

To accommodate various vehicle chassis lengths, it is desirable to be able to alter the length of the actuator and control cable 6. To accomplish this objective, the actuator and control conduit 14 (shown in FIG. 6) has a first conduit fitting 34 onto which is snapped a first flexible boot and snap-on assembly 36 that encloses and seals the actuator and control strand 16. A jumper strand assembly 38 is attached to strand 16 by a first retaining clip 40. The jumper strand 38 is attached to the continuation of actuator and control strand 16a by a second retaining clip 42 to allow for adjustments in the actuator and control cable lengths as installed on a motor vehicle. A second flexible boot 44 attached to the extended portion of the actuator and control cable conduit 48 and slips over the extended portion of actuator and control cable strand 16 to seal the strand. A grommet 50, fits onto the continuation of the actuator and control cable conduit 48 to provide a means to secure the conduit 48 to the vehicle.

It is anticipated that there are various suitable materials for the fabrication of this modular brake system. To achieve a durable watertight housing, it is anticipated that a moldable glass reinforced nylon be used to fabricate the housing to provide the appropriate strength and corrosion resistance. The reactive slide 10 may be made from die cast zinc with a nickel plating for added wear protection. This coating also reduces the coefficient of friction. The molded boots may be made of suitable flexible and durable materials, such as injection molded EPDM or Santoprene rubber.

The modular brake as described provides an efficient and compact assembly that is easy to assemble, corrosion resistant and which may be installed in vehicles of varying chassis length. It is understood that the invention as disclosed is representative of various embodiments and that the components and their arrangement may be altered by those skilled in the art without diminishing the scope of this invention.

What is claimed is:

1. A modular brake system comprising:
   a housing having a cavity with openings for receiving cables;
   a first cable comprising a strand disposed within a conduit, having one end of its conduit slidably entering said housing through a first opening and having its conduit affixed to said slide, the strand being slidably mounted within said slide and slidably exiting a second opening in said housing, and a second cable comprising a second strand disposed within a second conduit, said second conduit being affixed to said housing at a third opening adjacent to said first opening in said housing and said second strand being affixed to said slide.

2. A modular brake system comprising:
a housing defining a cavity having inner walls, said cavity having openings for receiving cables and said cavity defining channels on said inner walls;
a slide having pins, said slide mounted by said pins in said housing channels;
operator actuating means;
an actuating and control cable having a conduit wherein the conduit of said cable is affixed to said slide and slidably enters a first opening in said housing, said cable has a strand attached to said operator actuating means which slidably exits said housing at a second opening to connect with a first braking means; and
a second control cable having a strand disposed within a conduit, the conduit of said second cable being affixed to said housing adjacent said first opening and the strand of said second cable being affixed to said slide and exiting said housing to connect with a second braking means.

3. The modular brake system of claim 1, in which the housing has inner walls defining channels and the slide has one or more raised surfaces fitting within said channels.

4. The modular brake system of claim 1, in which the housing has rails on inner walls of said housing cavity for slidably receiving recessed portions of said slide.

5. The modular brake system of claim 1, wherein said slide has one or more wheels, said housing having recessed channels for receiving and guiding said one or more wheels.

6. A modular brake system of claim 1, wherein the portion of said first cable entering said housing at a first opening has means for altering its length.

7. A modular brake system of claim 6, wherein the altering means comprises a jumper strand with attachments for connecting to the first cable strand.

8. A modular brake system of claim 7, wherein flexible boots are attached to segment of said first cable conduit to enclose said cable strands exiting said conduits, and to seal openings in said conduits.

9. A modular brake system comprising:
a housing having a cavity and a plurality of apertures for providing access for passage of cables thereinto;
a reactive slide member slidably disposed within the cavity of the housing; and
first and second cables each comprising an inner strand and an outer conduit and having first and second ends thereof, with the inner strand at the first end extending beyond the outer conduit;
wherein the outer conduit at the first end of the first cable passes through a first aperture of the housing and is attached to the slide member with the inner strand at the first end of the first cable passing through the slide member and thereafter through a second opening of the housing to exit the cavity and to transmit forces to a first brake mechanism;
the outer conduit of the first end of the second cable is attached to the housing with the inner strand at the first end of the second cable passing through a third aperture of the housing to enter the cavity for attachment to said reactive slide member;
the inner strand of the first cable at the second end receiving forces from an actuating mechanism; and
the inner strand of the second cable at the second end capable of transmitting forces to a second brake mechanism.

10. The system of claim 9 wherein the slide member includes pins and the housing cavity includes channels wherein the slide member pins can slide back and forth within the housing channels.

11. The system of claim 9 wherein the slide member has a first upper portion and a second lower portion, with the outer conduit at the first end of the first cable attached to the first portion of the slide member and the inner strand at the first end of the second cable attached to the second portion of the slide member.

12. The system of claim 11 wherein the first portion of the slide member includes a guide tube for receiving the outer conduit of the first cable, and the housing includes a seal member operatively associated with the guide tube for preventing contaminants from entering the housing cavity.

13. The system of claim 9 wherein the housing includes means for attachment to a frame or axle of a vehicle.

14. The system of claim 9 wherein at least one of the first and second cables includes means for altering its length.

15. The system of claim 14 wherein the altering means comprises a jumper strand with attachments for connecting to the cable strand.

16. A housing for a modular cable actuating assembly comprising:
a formed shell having a cavity therein, said shell having recessed longitudinal channels in walls of said cavity,
a first opening in said shell providing access to said recessed channels,
a second opening in said shell generally opposite said first opening and generally in axial alignment with a center line of said each of said longitudinal channels, and
a third opening in said shell, said first opening and said third opening being in a hemisphere of said shell defined by a vertical plane generally bisecting said shell.

17. A housing for a modular cable actuating assembly comprising:
a formed shell having wall defining a cavity therein, said shell having recessed longitudinal raised surfaces on the walls of said cavity,
a first opening in said shell providing access to said raised surfaces,
a second opening in said shell generally opposite said first opening and generally in axial alignment with a center line of said each of said longitudinal raised surfaces, and
a third opening in said shell, said first opening and said third opening being in a hemisphere of said shell defined by a vertical plane generally bisecting said shell.

18. A housing for a modular cable actuating assembly as claimed in claims 16 or 17 in which there are one or more openings in said shell in the same hemisphere of said first opening.

19. A housing for a modular brake actuating assembly as claimed in claims 16 or 17 in which sealing means seal said openings and components inserted therein from contaminants.

20. A modular brake system comprising:
a housing defining a cavity having opposed side wall surfaces;
a slide positioned for movement within said cavity;
means for moving said slide to actuate a first braking means, said first braking means being actuatable in a first direction in response to movement of said slide in an opposite direction; and
means movable within said housing for actuating a second braking means further comprising means on said side wall surfaces for guiding movement of said slide relative thereto wherein said means for guiding comprises channels formed in said side wall surface and said slide has at least one raised surface positionable for sliding movement within at least one of said channels.

21. A modular brake system according to claim 20, wherein said channels extend substantially parallel to a longitudinal axis of said housing.

22. A modular brake system according to claim 20, wherein said means for guiding comprises rails on said sidewall surfaces for slidably receiving recessed portions of said slide.

23. A modular brake system according to claim 20, wherein said slide has one or more wheels, said means for guiding means being adapted to receive and support said wheels.

24. A modular brake system according to claim 22, wherein said slide moving means comprises a conduit affixed to said slide and said means for actuating a second braking means comprises a strand movably disposed within said conduit.

25. A modular brake system according to claim 24, further comprising:
a cable having a second strand and an associated conduit, the conduit of said cable being affixed to said slide and said second strand being movable in said first direction to actuate said first braking means.

* * * * *